US007013953B2

(12) United States Patent
Jung

(10) Patent No.: US 7,013,953 B2
(45) Date of Patent: Mar. 21, 2006

(54) HEAT EXCHANGER FOR WASTED HEAT WITH ITS CLEANING APPARATUS

(76) Inventor: A-Ra Jung, (20) 21-2 Singung-ri, Paengseong-eup, Pyeongtaek-si, Gyeonggi-do, 451-806 (KR)

( * ) Notice: Subject to any disclaimer, the term of this patent is extended or adjusted under 35 U.S.C. 154(b) by 0 days.

(21) Appl. No.: 10/515,340

(22) PCT Filed: Mar. 4, 2004

(86) PCT No.: PCT/KR2004/000456

§ 371 (c)(1),
(2), (4) Date: Dec. 3, 2004

(87) PCT Pub. No.: WO2004/079286

PCT Pub. Date: Sep. 16, 2004

(65) Prior Publication Data

US 2005/0173102 A1 Aug. 11, 2005

(30) Foreign Application Priority Data

Mar. 4, 2003 (KR) ..................... 10-2003-0013494

(51) Int. Cl.
*B08B 3/02* (2006.01)
*F28G 1/16* (2006.01)
*F28D 7/10* (2006.01)

(52) U.S. Cl. ..................... 165/95; 134/103.3; 134/144; 165/66

(58) Field of Classification Search .................. 165/95, 165/94, 66, 901, DIG. 12, 157; 122/379, 122/390, 405; 134/24, 55, 103.3, 144, 172; 15/318, 318.1, 104.04
See application file for complete search history.

(56) References Cited

U.S. PATENT DOCUMENTS 3,645,420 A * 2/1972 Machado ..................... 222/23
4,025,362 A * 5/1977 Frauenfeld ................ 134/57 R
4,562,885 A * 1/1986 Pausch ........................ 165/84
4,577,680 A * 3/1986 Clem et al. ................... 165/95
4,589,898 A * 5/1986 Beaver ........................ 65/503
4,884,416 A * 12/1989 Hwang ........................ 62/303
4,907,542 A * 3/1990 Maeyama et al. .......... 122/379
5,279,357 A * 1/1994 Kennon et al. ............... 165/95

FOREIGN PATENT DOCUMENTS

CH 681174 A * 1/1993
JP 61-149721 A 7/1986
JP 05-322150 A 12/1993
JP 09-296998 A 11/1997
KR 2002-90167 A 11/2002

* cited by examiner

*Primary Examiner*—Tho Duong
(74) *Attorney, Agent, or Firm*—Hershkovitz & Associates; Abe Hershkovitz

(57) ABSTRACT

A waste heat recovery system includes: a tank; heat exchange pipes connected with one another in the form of a 'S' shape in multiple steps inside the tank and having city water flow pipes bound up into a bundle; circulation leading plates mounted between the heat exchange pipes for inducing a flow of waste water; movable nozzles mounted on the circulation leading plates and connected with a high pressure water pipe for spraying high pressure water onto the surface of the heat exchange pipe or having a brush for cleaning the surface of the heat exchange pipe; a nozzle driving part for driving the movable nozzle by means of a driving motor; and waste water inlet and outlet for flowing hot waste water from the upper portion to the lower portion of the tank and city water inlet and outlet for flowing city water from the lower portion to the upper portion of the tank.

13 Claims, 9 Drawing Sheets

HEAT EXCHANGER FOR WASTED HEAT WITH ITS CLEANING APPARATUS

TECHNICAL FIELD

The present invention relates to a waste heat recovery system with a cleaning apparatus for recovering heat of water wasted from a public bath, a factory or a swimming pool, and more particularly, to a waste heat recovery system with a cleaning apparatus, which can allow an effective recovery of waste heat and an easy cleaning of the waste heat recovery system, thereby increasing heat exchange efficiency and providing an easy maintenance.

BACKGROUND ART

In general, a waste heat recovery system for reusing heat of water wasted from a place where a great deal of hot water is used, such as a public bath, a swimming pool, a fish-farm, or other place, heats cold water inside a heat exchange pipe in such a manner that the heat exchange pipe for carrying cold water is installed inside a water tank and waste water of high temperature discharged from the public bath is induced into the water tank so as to transfer heat between the heat exchange pipe and the waste water. However, in the conventional waste heat recovery system, the waste water is strained through a filter before being induced into the water tank to prevent stopping of the water tank or a flow channel due to foreign matters because foreign matters or wastes contained in the waste water are induced into the water tank. However, the conventional waste heat recovery system has a problem in that it is difficult to transfer heat smoothly as the foreign matters are stained on the external surface of the heat exchange pipe or sludge is formed on the external surface of the heat exchange pipe in spite of installation of the filtering device while the waste heat recovery system is used for a long time. Therefore, the water tank has a cover or a hole for cleaning, and so, a user can remove the foreign matters using a brush. However, it is difficult to clean a conduit and the heat exchange pipe since the conduit and the heat exchange pipe are in a spiral form or have a complicated shape to increase the surface area for heat transfer.

DISCLOSURE OF INVENTION

Accordingly, it is an object of the present invention to provide a waste heat recovery system with a cleaning apparatus, which can easily clean a heat exchange pipe and provide a convenient maintenance. Another object of the present invention is to provide a waste heat recovery system with a cleaning apparatus, which can increase a heat recovery efficiency of waste heat.

To achieve the above objects, the present invention provides a waste heat recovery system with a cleaning apparatus including: a tank; a number of heat exchange pipes connected with one another in the form of a 'S' shape in multiple steps inside the tank and having a number of city water flow pipes bound up into a bundle; circulation leading plates mounted between the heat exchange pipes for inducing a flow of waste water; movable nozzles mounted on the circulation leading plates respectively, the movable nozzle being connected with a high pressure water pipe for spraying high pressure water onto the surface of the heat exchange pipe or having a brush for cleaning the surface of the heat exchange pipe; a nozzle driving part for driving the movable nozzle by means of a driving motor; and waste water inlet and outlet for flowing hot waste water from the upper portion to the lower portion of the tank and city water inlet and outlet for flowing city water from the lower portion to the upper portion of the tank.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

The present invention will now be described in detail in connection with preferred embodiments with reference to the accompanying drawings.

Figure 1:
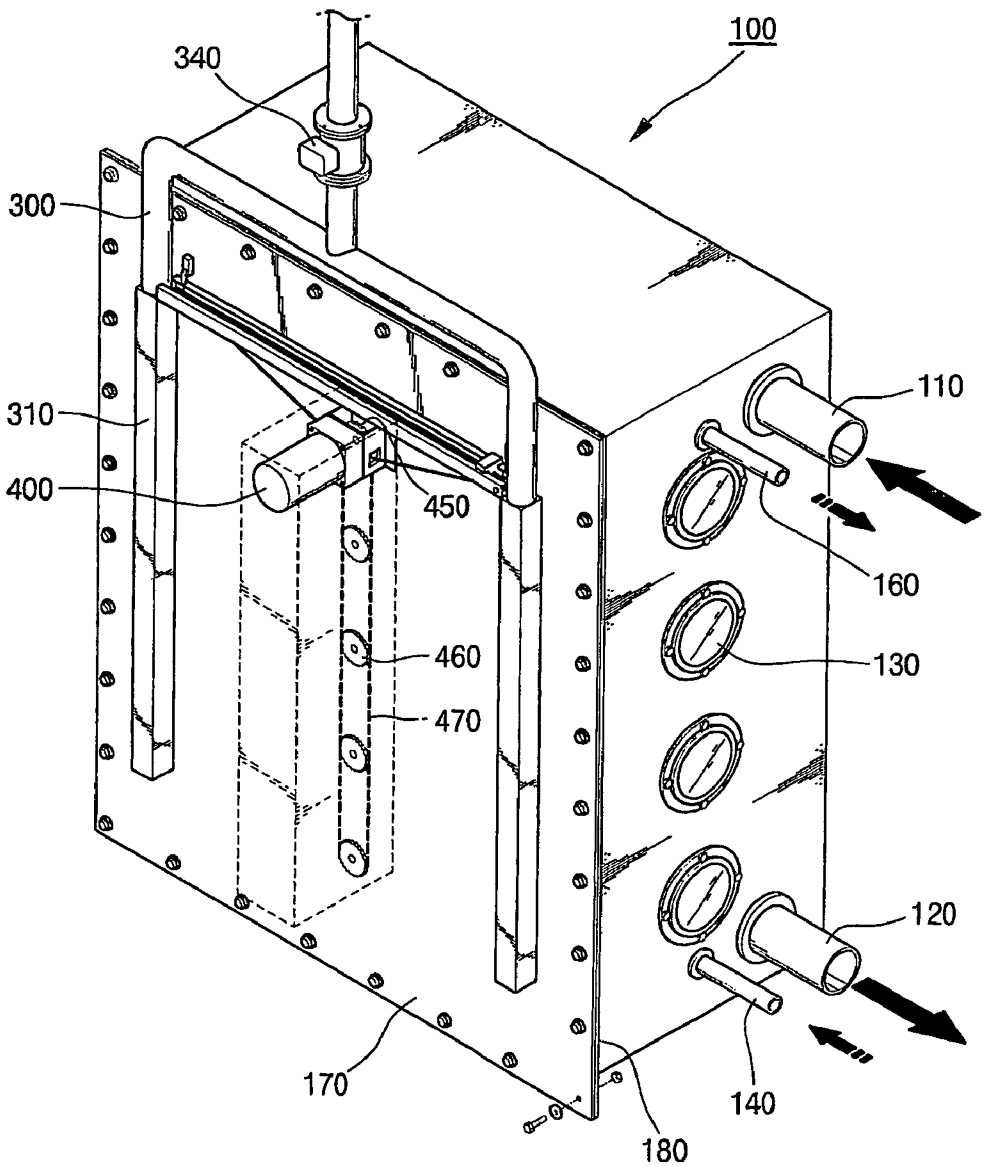
FIG. 1 is a view showing the external structure of a waste heat recovery system according to a first preferred embodiment of the present invention.
Figure 2:
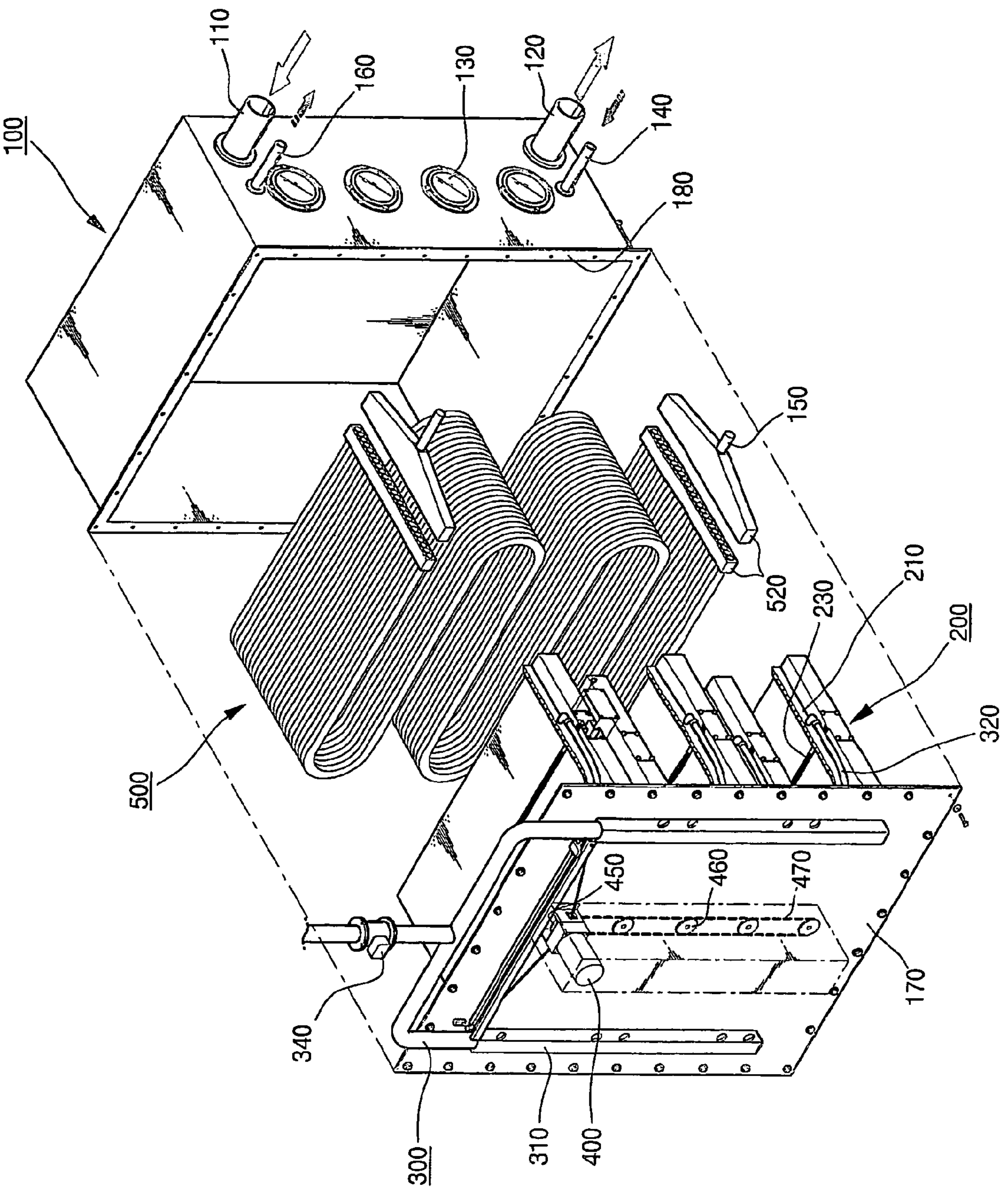
FIG. 2 is an exploded view of the waste heat recovery system according to the first preferred embodiment of the present invention.

As shown in FIGS. 1 and 2, a waste heat recovery system includes: a tank 100; a number of heat exchange pipes 500 connected with one another in the form of a 'S' shape in multiple steps inside the tank 100 and having a number of city water flow pipes bound up into a bundle; circulation leading plates 200 mounted between the heat exchange pipes 500 to form waste water paths; a movable nozzle part mounted on the outer surface of the circulation leading plate 200 and connected with a high pressure water induction pipe 300; a nozzle driving part mounted inside the circulation leading plate for driving the movable nozzle part along a guide rail 230 formed on the circulation leading plate 200; a driving part mounted on the outer surface of an assembly plate 170 of the tank 100 for driving the nozzle driving part; and a position sensing part connected to the driving part for controlling the rotational direction of a driving motor using a position sensor for sensing position of the movable nozzle part.

The driving part includes a driving pulley 450 mounted on a shaft of a driving motor 400, a number of slave pulleys 460 for transferring driving power of the driving motor 400, and a belt 470 for connecting the driving pulley and the slave pulley. The slave pulleys have the same number as the nozzle driving parts mounted on the circulation leading plates 200, so that driving power of the driving motor can be transferred to the entire nozzle driving parts of the circulation leading plates 200.

As shown in FIG. 2, a number of the circulation leading plates 200 are welded inside the assembly plate at regular intervals, and rectangular channels 310 are mounted at right and left sides of the outer surface of the assembly plate and connected with the high pressure water induction pipe 300. The assembly plate 170 is screwed to a tank flange 180 formed at a side of the tank 100 and assembled with the tank 100. An electronic valve 340 is mounted on the high pressure water induction pipe 300 for controlling induction of high pressure water.

The tank 100 includes a number of tank inspection holes 130 formed in a side portion thereof, a city water inlet 140 and a waste water outlet 120 formed in the lower portion of the side thereof, and a city water outlet 160 and a waste water inlet 110 formed in the upper portion of the side thereof, so that hot waste water flows from the upper portion to the lower portion of the tank and city water flows from the lower portion to the upper portion of the tank.

As shown in FIG. 2, the heat exchange pipe 500 has a number of the city water flow pipes of the 'S' shape, which are welded one another, and the surface of the heat exchange pipe 500 has a plate type structure for increasing a heat exchange efficiency and providing an easy cleaning of the surface thereof. The heat exchange pipe 500 may have a heat exchange pin mounted on the surface thereof to increase a heat transferring area within the limit allowing the easy cleaning. The circulation leading plates 200 and the heat exchange pipes 500 are designed in such a manner to be smoothly assembled at a little space from the tank 100 and to easily discharge sewage after the cleaning. The tank inspection holes 130 formed in the side of the tank 100 allows a user to inspect the inside of the tank with naked eyes and to clean the tank from the outside with high pressure water or any cleaning tool. The tank inspection holes 130 may be formed all sides or upper or lower portions of the tank as occasion demands. Temperature sensors (not shown) are mounted on the city water inlet and outlet 140 and 160 and the waste water inlet and outlet 110 and 120 to inspect the driving condition of the waste heat recovery system.

Figure 3:
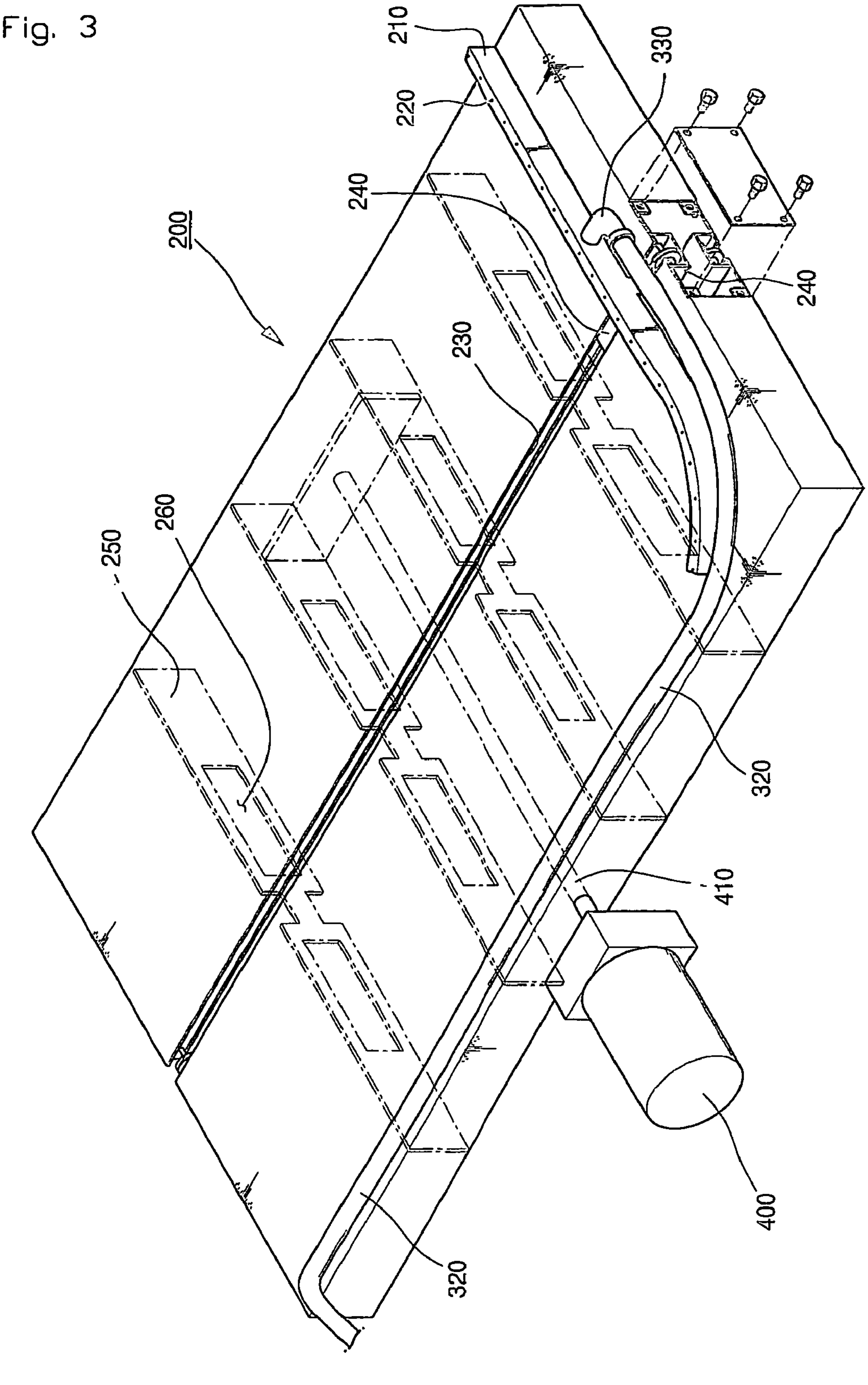
FIG. 3 is an exemplary view showing a structure of a circulation leading plate according to the first preferred embodiment of the present invention.

The plate type circulation leading plates 200 shown in FIG. 3 are mounted between the heat exchange pipes 500 of the 'S' shape for circulating waste water inside the tank in a zigzag form so as to transfer lots of heat to the city water of the heat exchange pipes as much as possible. The circulation leading plate 200 is a rectangular hollow box type, and includes the movable nozzle parts mounted on the upper and lower portions of the circulation leading plate 200, reinforcing plates 250 mounted inside the circulation leading plate 200 at regular intervals for reinforcing the nozzle driving part driving the movable nozzles 210 and the circulation leading plate 200, and through holes 260 formed in the reinforcing plates 250 for allowing easy installation and driving of the nozzle driving part and the movable nozzle part.

The movable nozzle part includes the movable nozzle 210 having a number of nozzle holes 220 formed in the upper portion thereof, a guide protrusion 240 formed on the lower surface of the movable nozzle 210 for guiding the movable nozzle onto the guide rail 230 formed on the circulation leading plate 200, a soft high pressure water distribution pipe 320 for connecting the movable nozzle 210 and the rectangular channel 310 to induce high pressure water, and a high pressure water connector 330 for connecting the high pressure water distribution pipe 320 to the movable nozzle 210. The movable nozzle 210 has a number of the nozzle holes 220 opposed to the surface of the heat exchange pipe 500, so that the high pressure water can clean the external surface of the heat exchange pipe. It is preferable that the movable nozzle 210, as shown in FIG. 3, has an arc-shaped edge formed on a side thereof so as to prevent damage of the edge of the movable nozzle when the high pressure water distribution pipe 320 moves together with the movable nozzle 210. The high pressure water distribution pipe 320 has a length sufficient to move the movable nozzle on the guide rail.

Figure 4:
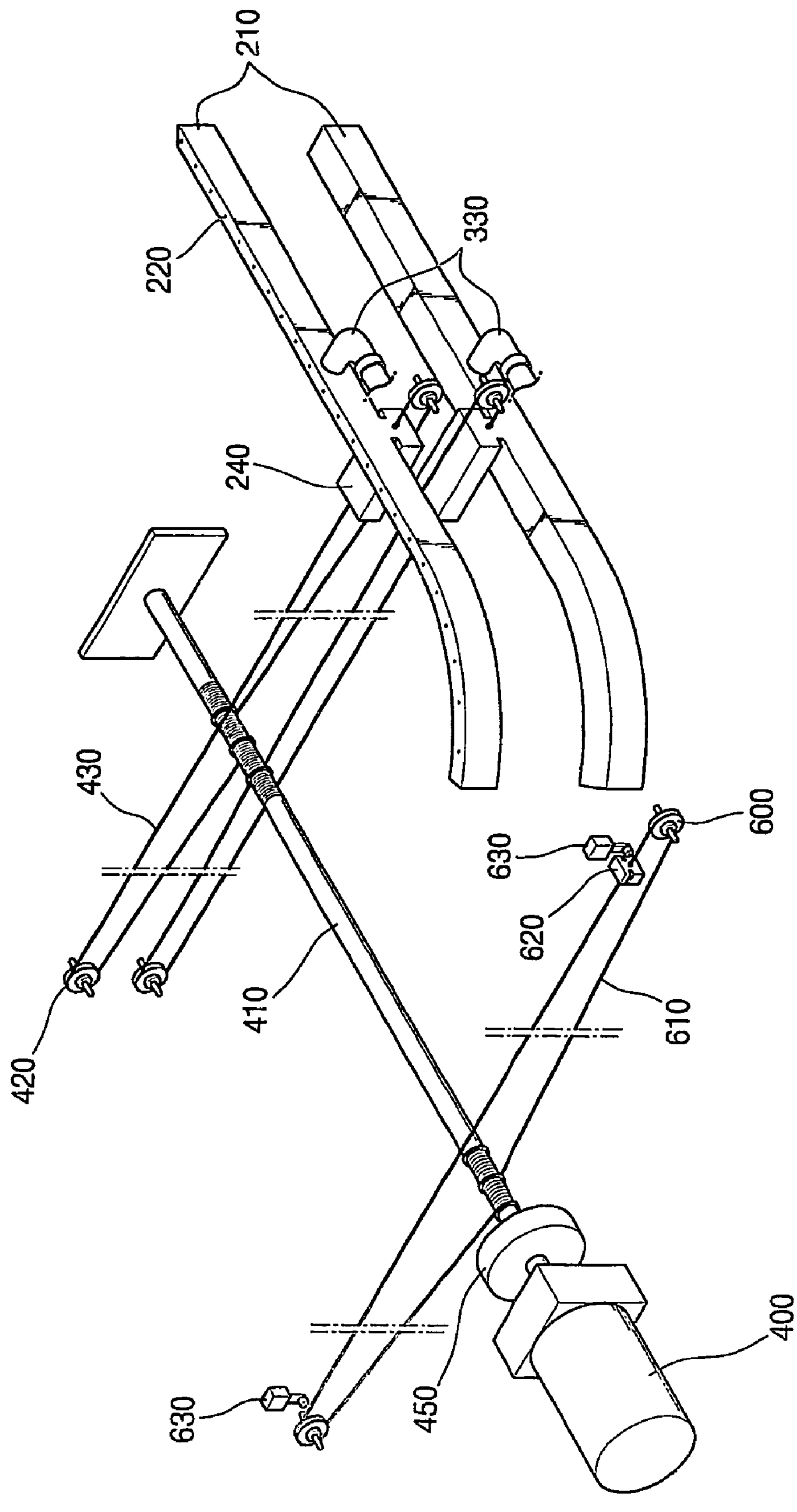
FIG. 4 is a view showing an operated state of a movable nozzle part according to the first preferred embodiment of the present invention.

As shown in FIG. 4, the nozzle driving part includes a driving shaft 410 connected with the driving motor 400, and a driving wire 430 wound on the driving shaft a round and supported by a support roller 420. When the driving shaft rotates, the driving wire 430 wound on the driving shaft is driven by frictional force between the driving wire 430 and the driving shaft, and thereby, the movable nozzle 210 connected with the driving wire is also moved. One driving shaft may have the driving wire and the support roller for supporting the driving wire to drive two movable nozzles 210 mounted on the upper and lower portions of the circulation leading plate 200. In this case, the driving wires 430 can be mounted right and left sides of the driving shaft to prevent interference between the driving wires 430. The movable nozzles 210 move along the guide rail 230 from a side of the circulation leading plate 200 to the other side thereof, and are returned to an original position as the rotational direction of the motor is changed by the sensing part when the movable nozzles 210 reach the other side of the circulation leading plate 200.

The position sensing part mounted on the outer surface of the assembly plate 170 includes a sensing wire 610 wound on the driving shaft 410 a round like the nozzle driving part and supported by a support roller 600, a movable body 620 mounted on the sensing wire 610, and a limit switch 630 for sensing movement position of the movable body. When the driving shaft rotates, the sensing wire 610 wound on the driving shaft is also moved, and thereby, the movable body 620 connected with the sensing wire 610 is also moved. The movable body and the limit switch 630 are mounted in such a manner that the movable body 620 is in contact with the limit switch 630 when the nozzle driving part is arrived at right and left ends of the circulation leading plate 200.

Figure 5:
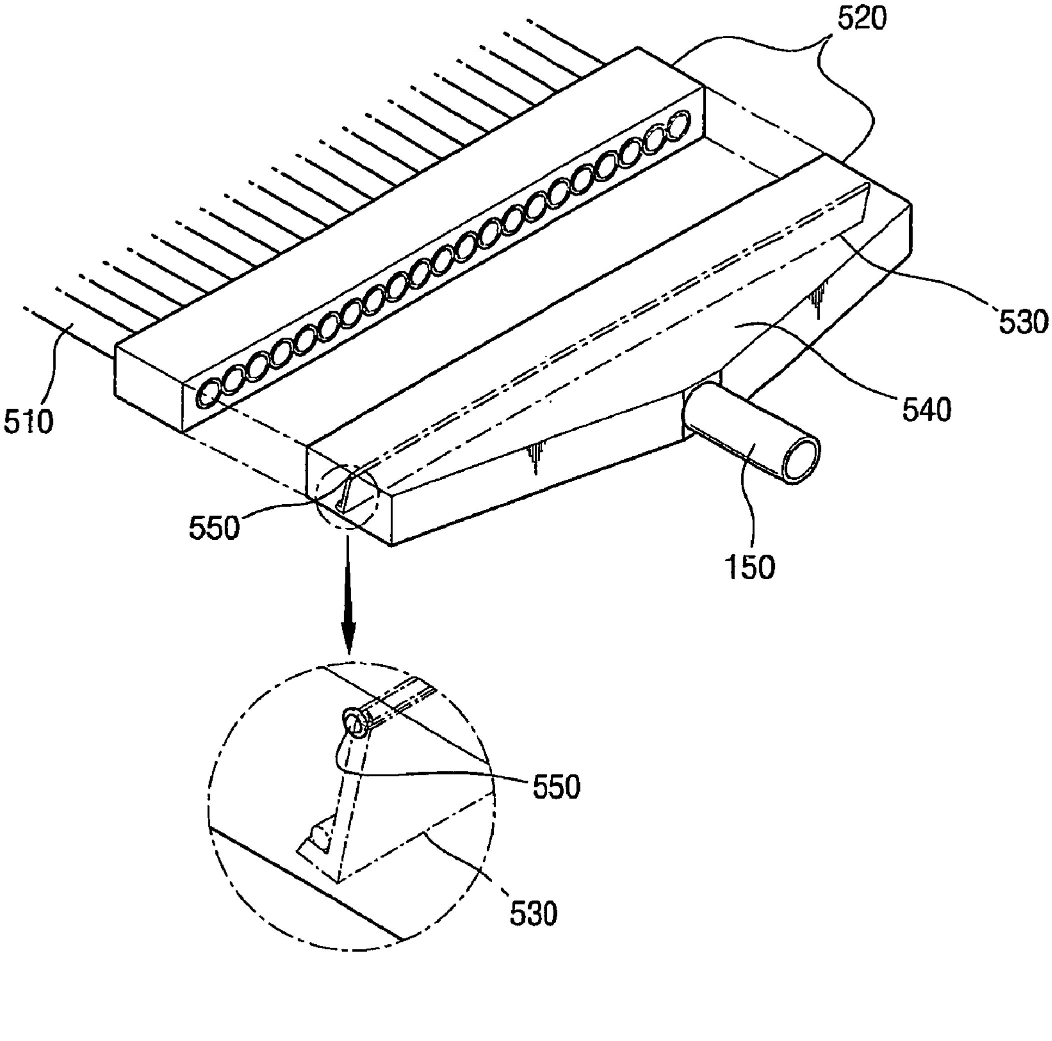
FIG. 5 is a view showing a structure of a heat exchange pipe according to the first preferred embodiment of the present invention.

FIG. 5 shows a structure of the heat exchange plate 500. The heat exchange pipe 500 having a number of the city water flow pipes bound into one is connected to the city water inlet and outlet 140 and 160 and a hollow box type city water connecting part 510. The city water connecting part 510 of the city water inlet 140 side has a flux control device 520 mounted therein so as to distribute city water inside the entire heat exchange pipe 500. The flux control device 520 is hinged to an upper plate 540 of the city water connecting part by means of a plate type member 530, and the lower portion of the plate type member 530 is heavier than the upper portion thereof and is mounted downwardly from a hinge shaft 550 by the self-weight. The plate type member 530 of the flux control device 520 is higher than the city water connecting part 510 and inclined somewhat against a perpendicular line.

Next, a driving process of the present invention will be described in detail. As shown in FIG. 2, in the upper portion of the tank, waste water is induced into the tank 100 through the waste water induction pipe 110 and transfers heat of the waste water to the heat exchange pipe 500 while flowing to the lower portion of the tank along the waste water path formed by the circulation leading plates 200. The city water is induced from the lower portion of the tank through the city water inlet 140 and flows along the S-shaped heat exchange pipe 500. The city water heated by heat of the waste water is discharged through the city water outlet 160 of the upper portion of the tank. The discharged city water is stored in a temporary storage tank (not shown) when additional heating is not needed, but transferred to a hot water boiler when additional heating is needed. The induced city water is distributed uniformly inside the entire heat exchange pipe 500 by means of the flux control device 520 of the city water inlet 140 side. The flux control device 520 closes a flow channel of the city water connecting part 510 by the weight of the plate type member 530 serving as a valve, and opens the flow channel while rotating on the hinge 550 due to hydraulic pressure of the city water. In this process, the plate type member 530 acts to distribute the city water uniformly in a width direction of the city water connecting part 510.

The present invention senses temperature of the inflow and outflow city water by means of the temperature sensor mounted on the city water inlet and outlet during driving of the waste heat recovery system to determine whether or not heat recovery is carried out properly. If the heat recovery efficiency is less than the optimum value, the waste heat recovery system determines it that foreign matters are accumulated on the surface of the heat exchange pipe and cleans the surface of the heat exchange pipe. In general, a boiler system in a public bath and other boiler system do not need additional pump for generating high pressure as using high pressure water, but in case of boiler systems which do not use high pressure water, additional pump is mounted between the existing boiler system and the waste heat recovery system of the present invention. When the electronic valve 340 is opened by means of a controller to induce high pressure water into the circulation leading plates 200, the high pressure water is induced into the rectangular channel 310 through the high pressure water induction pipe 300, and the high pressure water is induced into each movable nozzle 210 through the high pressure water distribution pipe 320 and sprayed onto the surface of the heat exchange pipe. The high pressure water removes sewage stained on the surface of the heat exchange pipe 500 and discharged to a space between the heat exchange pipe 500 and the tank body. The high pressure water is discharged to the outside of the tank together with the waste water. If necessary, a sewage discharge hole is formed in the tank to discharge sewage to the outside of the tank.

Referring to FIGS. 3 and 4, the operation of the movable nozzle part will be described in detail. Each movable nozzle 210 is driven by the driving motor 400 and moves along the guide rail 230 of the circulation leading plate 200, and at this time, the movable body 620 of the position sensing part is also moved in the same way as the movable nozzle 210. When the movable nozzle 210 arrives at an end portion of a side of the circulation leading plate, the movable body contacts with the limit switch 630 located at a side of the movable body, and the controller inverts the rotational direction of the driving motor by a signal of the limit switch 630. As a result, the movable nozzle returns to its original position, and the movable body moving in the same way as the movable nozzle 210 is in contact with the limit switch 630 of the other side of the movable body and transfers the signal to the controller. Thereby, the driving motor is stopped, and the electronic valve 340 is closed.

If one driving of the movable nozzle part cannot provide sufficient cleaning and heat recovery efficiency, the movable nozzle part carries out the cleaning of the heat exchange pipe several times. If the heat exchange pipe is not cleaned sufficiently even by the above method, as a subsidiary method, the user directly sprays high pressure water onto the surface of the heat exchange pipe by inserting a high pressure hose or other cleaning tool into the tank inspection holes 130 formed in the side surface of the tank.

If there is a need to replace the internal components or clean the inside of the waste heat recovery system due to a long term use of the waste heat recovery system, the screw coupling between the assembly plate 170 and the tank flange 180 formed at a side of the tank is unscrewed so as to separate the assembly plate 170 from the tank 100, so that the user can easily replace the internal components or clean the inside of the tank.

Figure 6:
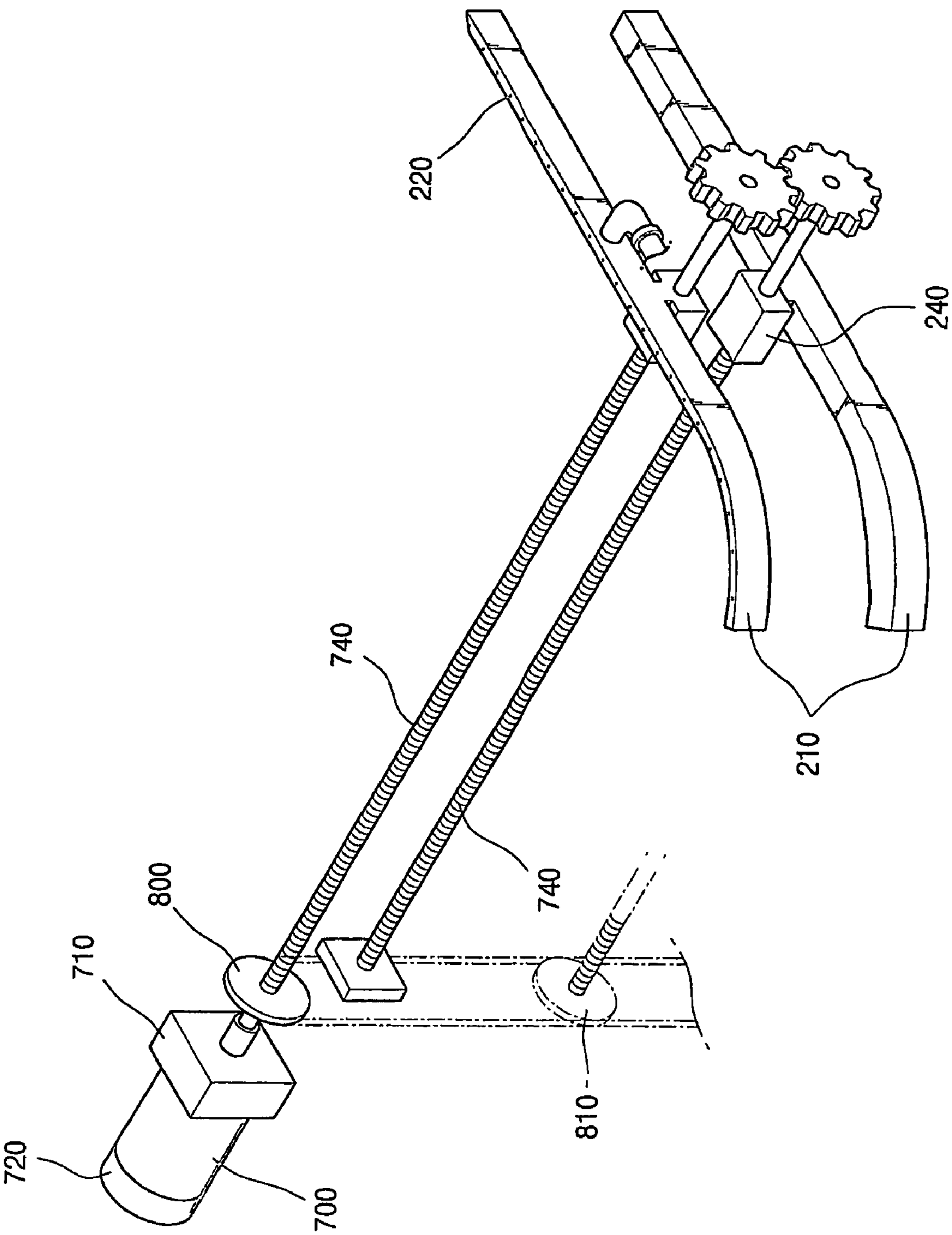
FIG. 6 is a view showing a waste heat recovery system according to a second preferred embodiment of the present invention.

FIG. 6 shows a second preferred embodiment of the present invention. In the second preferred embodiment, the waste heat recovery system adopts a motor driving type nozzle driving part, differently from the first preferred embodiment, in which the wire driving type nozzle driving part having the driving motor, the driving wire and the pulleys. The motor driving type driving part shown in FIG. 6 includes a driving motor 700, a deceleration gear 710 connected with the driving motor 700, a rotation sensor 720 for sensing rotational frequency of the driving motor 700, and a power transferring part 800 for transferring driving power of the deceleration gear to each driving shaft 740. The power transferring part 800 has pulleys 810 mounted on the driving shafts 740 and connected with the deceleration gear 710 by means of belts. The pulleys 810 are oppositely mounted so as to rotate the adjacent driving shafts in the opposite directions.

The nozzle driving part has the driving shafts 740, which has an end connected with the pulley 810, the other end connected with a driving shaft supporter 750, and a screw thread for slidably moving the guide protrusion 240. The guide protrusion 240 is connected with the two movable nozzles 210 mounted on the upper and lower portions of the circulation leading plate 200.

The driving part shown in FIG. 6 is mounted on the outer surface of the tank 100 to drive the movable nozzles 210 in a longitudinal direction of the circulation leading plate 200. The driving motor 700, the deceleration gear 710 and the power transferring part 800 can be installed in consideration of relationship between other components. Furthermore, the driving shafts 740 mounted on the adjacent circulation leading plates have opposed rotational directions due to the pulleys mounted oppositely. Therefore, one of the adjacent driving shafts has a right-hand screw and the other has a left-hand screw to drive the movable nozzles 210 mounted on different circulation leading plates 200 in the same direction. The shape of the reinforcing plate 250 or the internal structure of the circulation leading plate 200 in which the nozzle driving part is mounted can be changed to easily operate the guide protrusion 240 along the driving shaft 740.

A driving process of the motor driving type waste heat recovery system as shown in FIG. 6 will be described in detail. When the driving motors 700 drive, driving power transferred to each pulley 810 through the deceleration gear 710, and thereby, the driving shafts 740 connected with the pulleys respectively are rotated. Thereby, the guide protrusions 240 coupled with the movable nozzles 210 slide on the driving shafts 740. When the driving motors drive, the electronic valve 330 is opened by the controller, and high pressure water is induced into the movable nozzles 210 and sprayed onto the surface of the heat exchange pipe. The controller discriminates by means of the rotation sensor 720 whether or not the movable nozzles 210 arrive at the end portions of the sides of the circulation leading plates 200, and change the rotational direction of the driving motors 700. When the movable nozzles are returned to their original positions, the driving motors 700 stop the driving and the electronic valve is closed. The driving motors 700, which are mounted on the circulation leading plates 200 respectively, are driven by one controller in the same way, and operate the movable nozzles 210 of the circulation leading plates 200.

Figure 7:
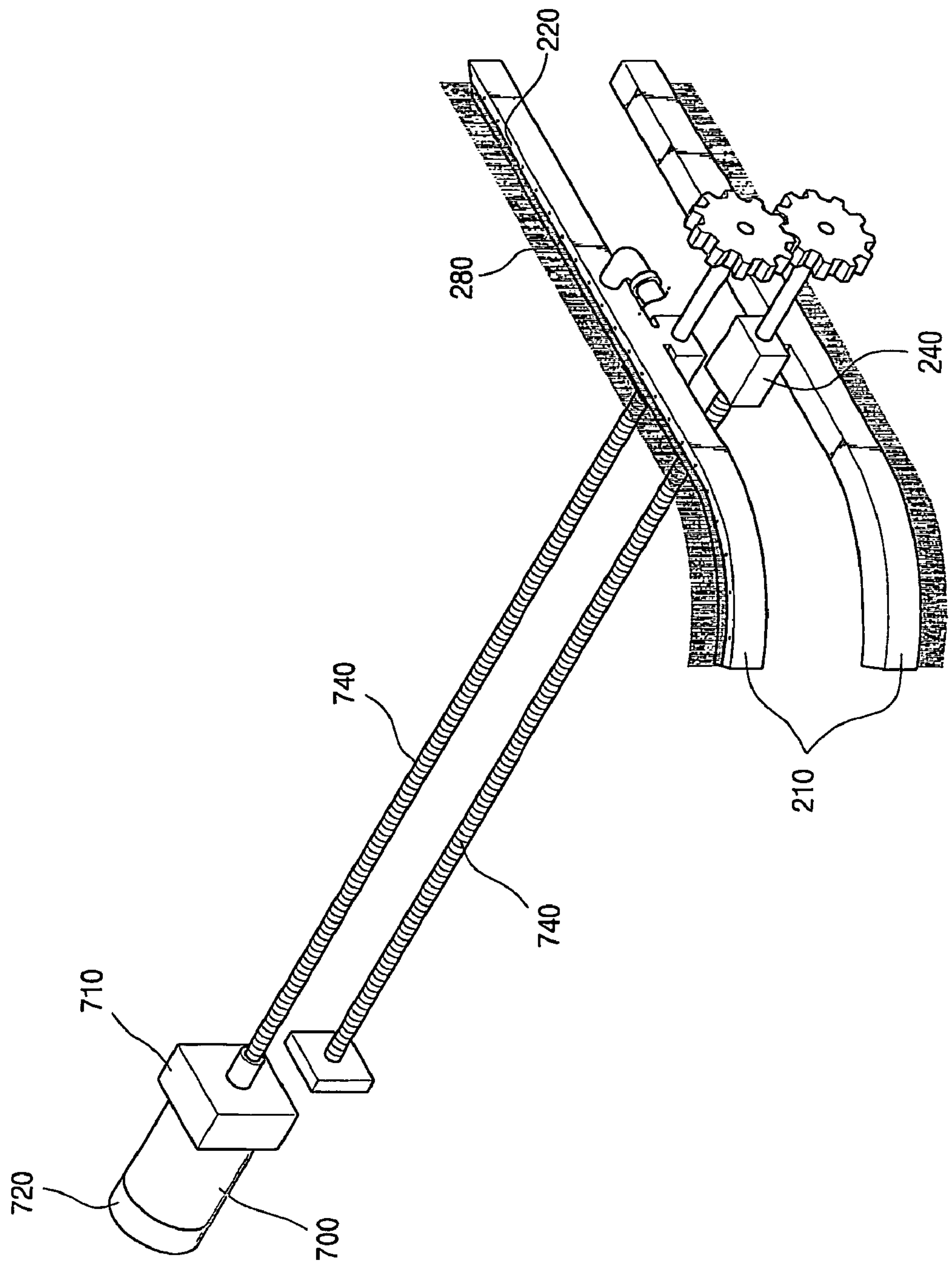
FIG. 7 is a view showing a movable nozzle part according to a third preferred embodiment of the present invention.

FIG. 7 shows a third preferred embodiment of the present invention, which adopts a brush cleaning type waste heat recovery system for directly cleaning the surface of the heat exchange pipe by mounting a brush on each movable nozzle.

As shown in FIG. 7, a brush 280 is mounted on the upper surface of the movable nozzle 210 in such a manner not to stop the nozzle holes 220. The brush 280 is in a direct contact with the surface of the heat exchange pipe 500 and operated in the longitudinal direction of the heat exchange pipe 500 to remove foreign matters stained on the surface of the heat exchange pipe. The movable nozzles having the brushes 280 can be adopted on both of the wire driving type waste heat recovery system shown in FIG. 4 and the motor driving type waste heat recovery system shown in FIG. 6. This embodiment can adopt all of the high pressure water cleaning method for cleaning the surface of the heat exchange pipe with high pressure water and the brush cleaning method for cleaning the surface of the heat exchange pipe with the brush mounted on the movable nozzle.

Figure 8:
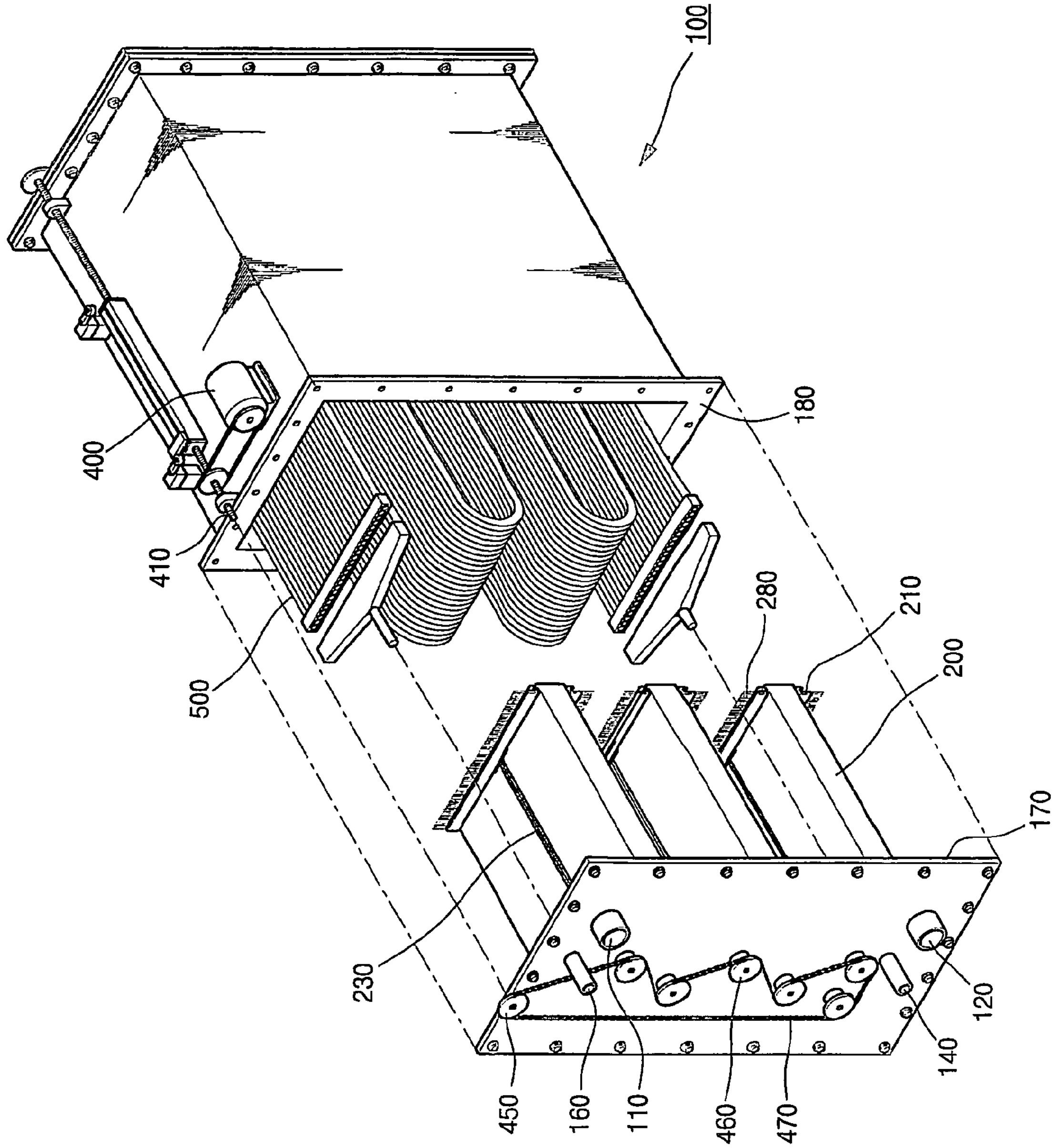
FIG. 8 is view showing a wasted heat recovery system according to a fourth preferred embodiment of the present invention.

FIG. 8 shows a fourth preferred embodiment of the present invention adopting a brush cleaning type waste heat recovery system for cleaning the surface of the heat exchange pipe only with brushes mounted on the movable nozzles, from which components related with high pressure water mounted on the waste heat recovery systems according to the first to third preferred embodiments are all removed.

In the waste heat recovery system shown in FIG. 8, the high pressure induction pipe 300, the rectangular channel 310 and the electronic valve 340 mounted on the outer surface of the waste heat recovery system are removed, the movable nozzle 210 of the movable nozzle part does not have a number of the nozzle holes 220, and the soft high pressure water distribution pipe 320 for inducing the high pressure water and the high pressure water connector 330 for connecting the high pressure water distribution pipe 320 to the movable nozzle 210 are also removed.

Therefore, the waste heat recovery system shown in FIG. 8 includes: a tank 100; a number of heat exchange pipes 500 connected with one another in the form of a 'S' shape in multiple steps inside the tank 100 and having a number of city water flow pipes bound up into a bundle; circulation leading plates 200 mounted between the heat exchange pipes 500 to form waste water paths; a movable nozzle part mounted on the outer surface of the circulation leading plates 200 and having brushes 280; a nozzle driving part mounted inside the circulation leading plates for driving the movable nozzle part along guide rails 230 formed on the circulation leading plates 200; a driving part mounted on the outer surface of the tank lo for driving the nozzle driving part; and a position sensing part connected to the driving part to control a rotational direction of a driving motor using a position sensor for sensing position of the movable nozzle part.

The nozzle driving part can adopt the wire driving type of the first preferred embodiment or the motor driving type of the second preferred embodiment.

The brush cleaning type waste heat recovery system for cleaning the surface of the heat exchange pipe only with the brushes can provide a simple structure and an easy maintenance as not needing the components related with high pressure water.

The operation process of the brush cleaning type waste heat recovery system will be described. In the waste heat recovery system, the temperature sensors mounted on the city water inlet and outlet senses temperature of the inflow and outflow city water during the driving of the waste heat recovery system to determine whether or not heat recovery is carried out properly. If the heat recovery efficiency is less than the optimum value, the recovery system determines that foreign matters are accumulated on the surface of the heat exchange pipe, and operates the controller to clean the heat exchange pipe. The controller operates the driving motor 400, and operates the movable nozzles 210 having the brushes to clean the surface of the heat exchange pipe. The rotation sensor 720 discriminates whether or not the movable nozzles 210 arrive at the ends of the circulation leading plates, and change the rotational direction of the driving motors. The controller controls the driving motors to repeat the above motion several times till the foreign matters formed on the surface of the heat exchange pipe 500 are removed, and after that, determines that the heat recovery efficiency is increased by measuring the temperature of the inflow and outflow city water.

Figure 9:
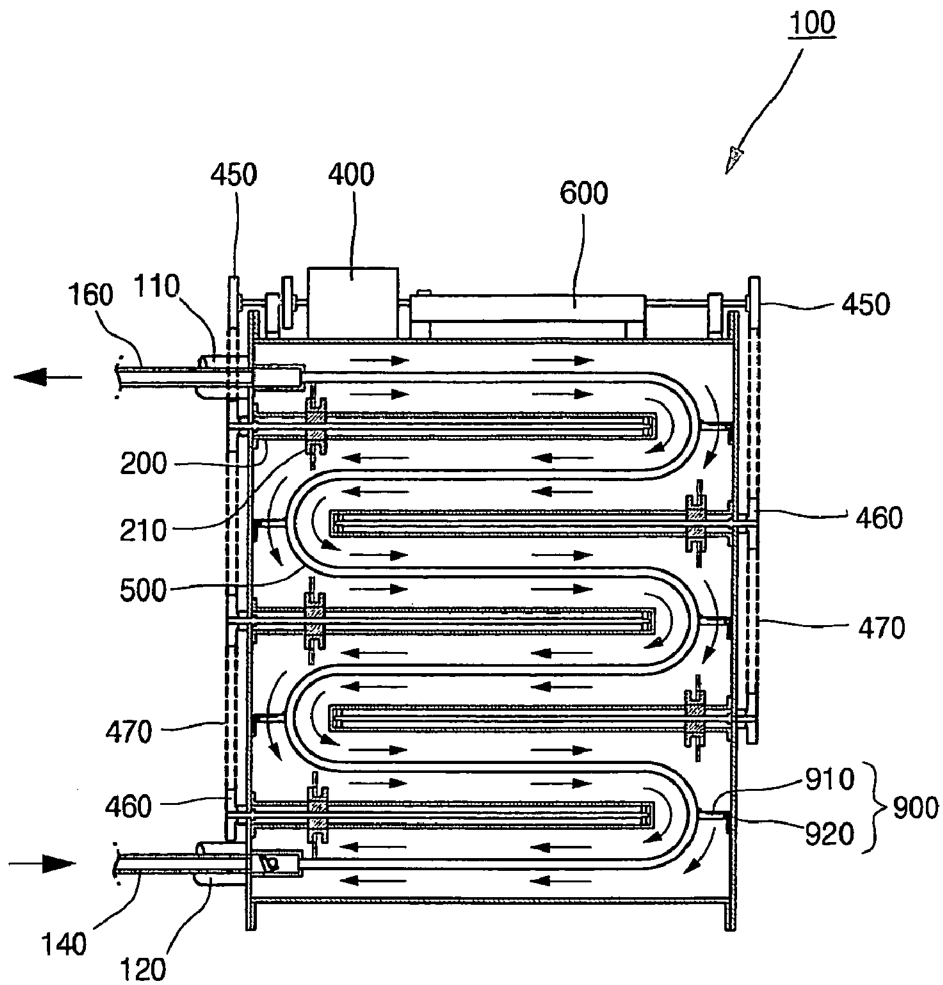
FIG. 9 is a view showing a waste water dividing device according to the present invention.

FIG. 9 shows a waste water distribution device for improving a flow of waste water. The waste water distribution device 900 serves to uniformly distribute the waste water induced from the upper portion of the waste heat recovery system to the whole heat exchange pipe 500. For this, as shown in FIG. 9, the waste water distribution devices are installed at curved portions of the heat exchange pipe. The waste water distribution device 900 includes a plate type member 910 connected to the waste heat recovery system body by means of a hinge shaft 920 to distribute waste water in the width direction of the heat exchange pipe. A torsion spring is mounted on the hinge shaft 920 or a coil spring is mounted on the bottom surface of the plate type member 910 to prevent drooping of the plate type member 910 due to its self weight. The waste water distribution device having the above structure closes the flow channel of the waste water in normal times, but opens the flow channel by the rotation of the plate type member 910 on the hinge shaft 920 when waste water is flown in.

In the present invention, the waste heat recovery system has a packing mounted on the guide rail 230 of the circulation leading plate 200, on which the movable nozzle 210 is moved, to prevent induction of sewage of waste water into the circulation leading plate. The packing can be mounted on the guide rail as there is an interval between the guide protrusion, which is connected with the movable nozzle and moves on the guide rail, and the guide rail. At this time, it is preferable the packing split at the center is used to make a gap when the guide protrusion is moved.

Moreover, in the present invention, other heat transferring fluid or heat transfer oil of high specific heat capacity for reducing corrosion of the pipe channel can be used in stead of city water. In addition, refrigerant can be used in stead of city water. The refrigerant, which passed an evaporator of a cooling system, passes the waste heat recovery system and preheated before being inserted into a compressor to reduce energy consumption of the compressor. Alternatively, the present invention can evaporate the refrigerant without energy consumption by the waste heat recovery system of the present invention serving as the evaporator of the cooling system.

INDUSTRIAL APPLICABILITY

As described above, the waste heat recovery system of the heat exchange method for recovering heat of water wasted from a public bath, a factory or a swimming pool can easily clean the heat exchange pipe, thereby increasing heat exchange efficiency and providing an easy maintenance. Therefore, the present invention can solve the problems of the existing heat exchange systems, such as decrease of heat exchange efficiency due to a long-term use and inconvenient maintenance.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A waste heat recovery system with a cleaning apparatus comprising:

a tank (100);

heat exchange pipes (500) connected with one another in the form of a 'S' shape in multiple steps inside the tank (100) and having a number of city water flow pipes bound up into a bundle;

circulation leading plates (200) mounted between the heat exchange pipes (500) to form waste water paths;

a movable nozzle part mounted on the outer surface of the circulation leading plates (200);

a nozzle driving part mounted inside the circulation leading plates (200) for driving the movable nozzle part along guide rails (230) formed on the circulation leading plates (200);

a driving part mounted on the outer surface of the tank (100) for driving the nozzle driving part;

a position sensing part connected to the driving part for sensing position of the movable nozzle part; and a city water inlet (140) and a waste water outlet (120) formed in the lower portion of a side of the tank and a city water outlet (160) and a waste water inlet (110) formed in the upper portion of the side of the tank.

2. The waste heat recovery system according to claim 1, wherein the driving part includes a driving pulley (450) mounted on a shaft of a driving motor (400), a number of slave pulleys (460) for transferring driving power of the driving motor (400), and a belt (470) for connecting the driving pulley (450) and the slave pulleys (460), and the slave pulleys of the same number as the nozzle driving parts mounted on the circulation leading plates (200) are mounted.

3. The waste heat recovery system according to claim 1, wherein the movable nozzle part includes the movable nozzle (210) having a number of nozzle holes (220) formed in the upper portion thereof, a guide protrusion (240) formed on the lower surface of the movable nozzle (210) for guiding the movable nozzle (210) onto the guide rail (230) formed on the circulation leading plate (200), a soft high pressure water distribution pipe (320) connected with the movable nozzle (210) for inducing high pressure water, and a high pressure water connector (330) for connecting the high pressure water distribution pipe (320) to the movable nozzle (210).

4. The waste heat recovery system according to claim 1, wherein the nozzle driving part includes a driving shaft (410), and a driving wire (430) wound on the driving shaft (410) a round and supported by a support roller (420).

5. The waste heat recovery system according to claim 1, wherein the position sensing part includes a sensing wire (610) wound on the driving shaft (410) a round and supported by a support roller (600), a movable body (620) mounted on the sensing wire (610), and a limit switch (630) for sensing moving position of the movable body.

6. The waste heat recovery system according to claim 1, wherein the circulation leading plate (200) has a rectangular hollow box shape, and includes the movable nozzle parts mounted on the upper and lower portions of the circulation leading plates (200), a reinforcing plate (250) mounted inside the circulation leading plate (200) at regular intervals for reinforcing the nozzle driving part for driving the movable nozzle (210) and the circulation leading plate (200), and a through hole (260) formed in the reinforcing plate (250).

7. The waste heat recovery system according to claim 1, wherein the heat exchange pipe (500) is connected to the city water inlet and outlet (140 and 160) and a hollow box type city water connecting part (510), and the city water connecting part (510) of the city water inlet (140) side has a flux control device (520) mounted therein.

8. The waste heat recovery system according to claim 7, wherein the flux control device (520) is hinged to an upper plate (540) of the city water connecting part (510) by means of a plate type member (530), and the lower portion of the plate type member (530) is heavier than the upper portion thereof.

9. The waste heat recovery system according to claim 1, wherein the driving part includes a driving motor (700), a deceleration gear (710) connected with the driving motor (700), a rotation sensor (720) for sensing rotation frequency of the driving motor (700), and a power transferring part (800) for transferring driving power of the deceleration gear (710) to each driving shaft (740).

10. The waste heat recovery system according to claim 9, wherein the power transferring part (800) has pulleys (810) mounted on the driving shafts (740) and connected with the deceleration gear (710) by means of belts, and the pulleys (810) are oppositely mounted to rotate the adjacent driving shafts in the opposite directions.

11. The waste heat recovery system according to claim 9, wherein the nozzle driving part has the driving shafts (740), which has an end connected with the pulley (810), the other end connected with a driving shaft supporter (750), and a screw thread for slidably moving the guide protrusion (240).

12. The waste heat recovery system according to claim 10, wherein the guide protrusion (240) is connected with the two movable nozzles (210) mounted on the upper and lower portions of the circulation leading plate (200).

13. The waste heat recovery system according to claim 1, wherein the movable nozzle part of the circulation leading plate (200) has movable nozzles (210), each other which has a brush (280).

* * * * *